Nov. 14, 1950     A. L. BATIK     2,529,898
AXLE SUSPENSION DEVICE FOR VEHICLES
Filed July 14, 1947     3 Sheets—Sheet 1
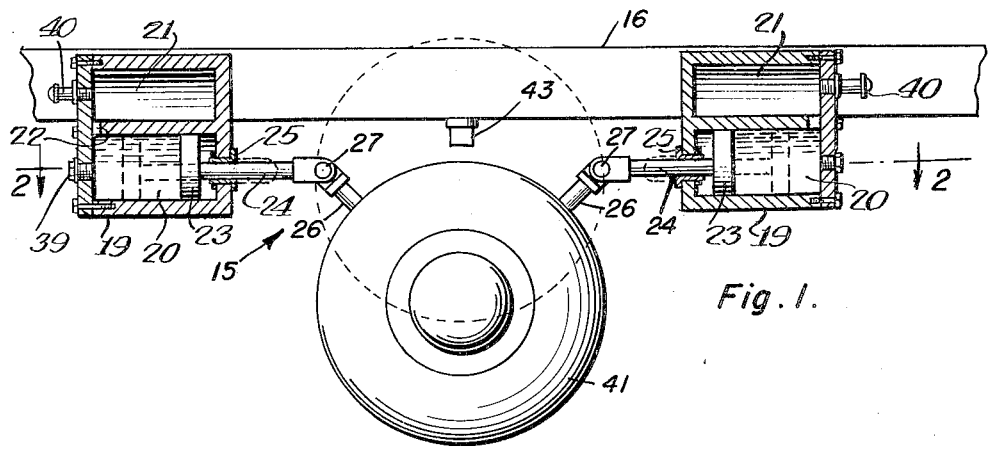
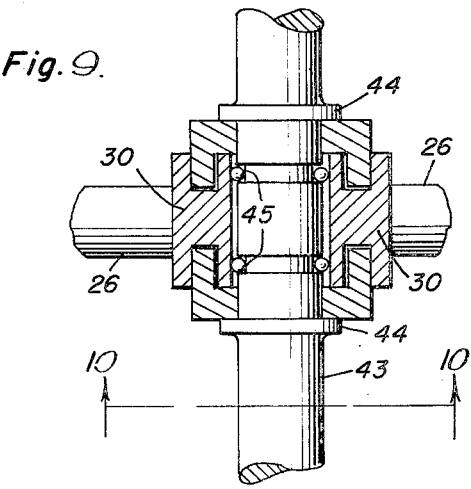
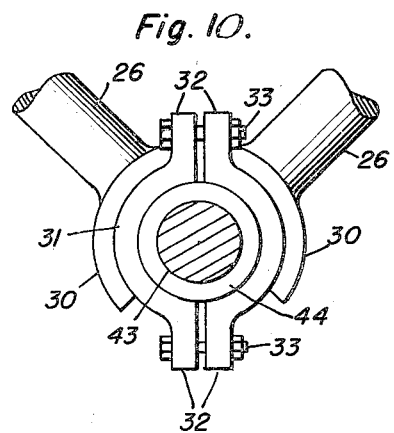
Inventor
Albert Lloyd Batik
By *Clarence A. O'Brien and Harvey B. Jackson*
Attorneys Inventor Albert Lloyd Batik By Clarence A. O'Brien and Harvey B. Jacobson
Attorneys Nov. 14, 1950  A. L. BATIK  2,529,898
AXLE SUSPENSION DEVICE FOR VEHICLES
Filed July 14, 1947  3 Sheets-Sheet 3

Inventor
Albert Lloyd Batik

By Clarence A. O'Brien
and Harvey B. Jacobson
Attorneys

Patented Nov. 14, 1950

2,529,898

UNITED STATES PATENT OFFICE 2,529,898

AXLE SUSPENSION DEVICE FOR VEHICLES

Albert Lloyd Batik, New York, N. Y.

Application July 14, 1947, Serial No. 760,885

1 Claim. (Cl. 280—124)

This invention relates to new and useful improvements and structural refinements in axle suspension devices for vehicles, more specifically, automobiles, trucks, railroad cars, and the like, and the principal object of the invention is to provide a device of the character herein described, which may be conveniently and effectively employed for minimizing the effect of road shocks by preventing them from reaching the frame of the vehicle.

A further object of the invention is to provide an axle suspension device which is simple in construction and which will operate effectively for a considerable period of time without adjustment or other attention.

Another object of the invention is to provide an axle suspension device which will not easily become damaged and which is otherwise well adapted for the purpose for which it is intended.

With the above more important objects in view and such other objects as may become apparent as this specification proceeds, the invention consists essentially of the construction and arrangement of parts as shown in the accompanying drawings in which:

Figure 1 is a side elevation of the invention shown partially in section to reveal its construction;

Figure 9 is a modified embodiment of the structure shown in Figures 3, 4 and 5, and;

Figure 10 is a cross sectional view, taken substantially in the plane of the line 10—10 in Figure 9.

Like characters of reference are used to designate like parts in the specification and throughout the several views.

Figure 2:
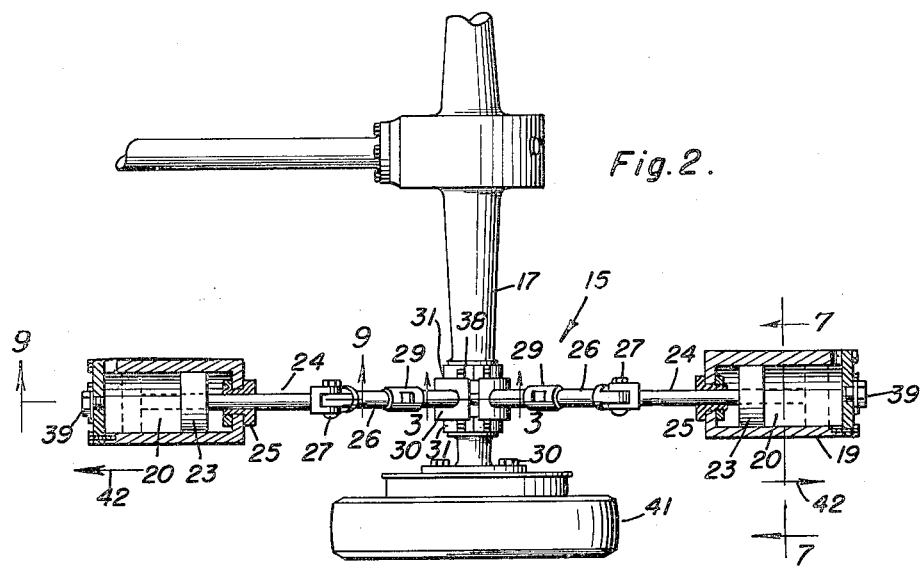
Figure 2 is a top plan view thereof, also partly in section.
Figure 8:
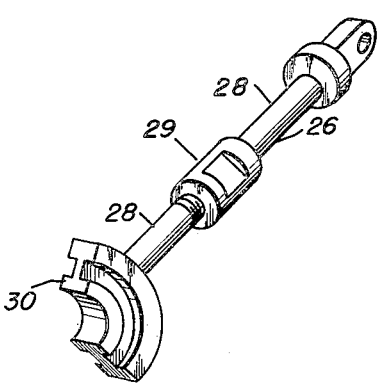
Figure 8 is a perspective view of one of the radius links used in the invention.
Figure 7:
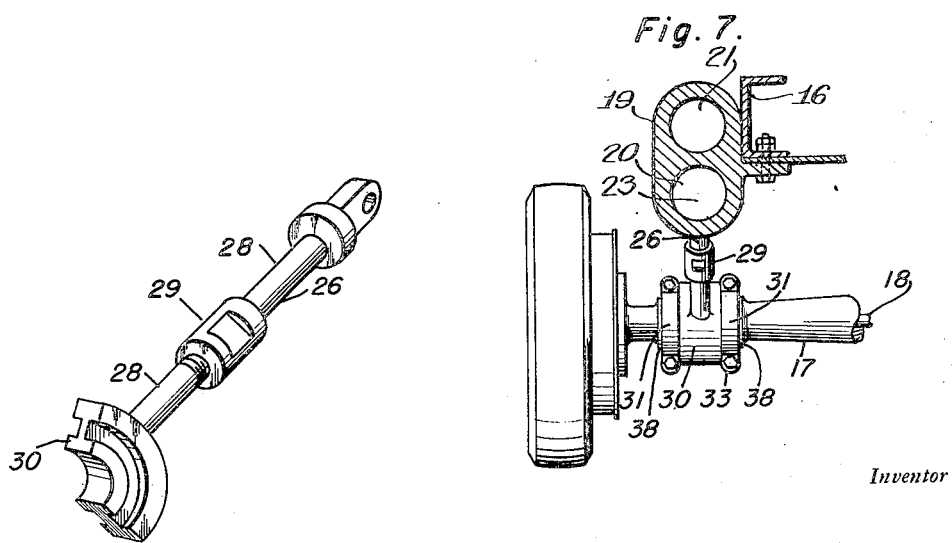
Figure 7 is a cross sectional view, taken substantially in the plane of the line 7—7 in Figure 2.
Figure 3:
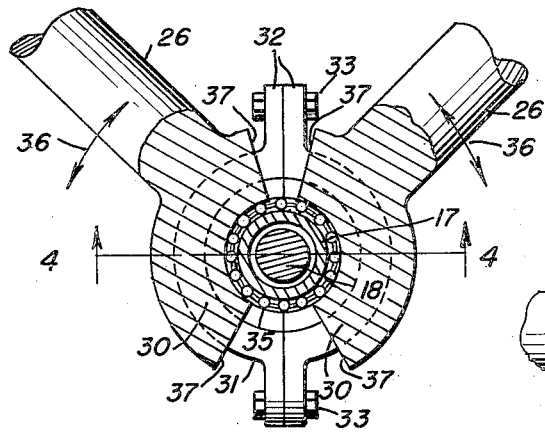
Figure 3 is a cross sectional view, taken substantially in the plane of the line 3—3 in Figure 2.

Referring now to the accompanying drawings in detail, the invention consists of an axle suspension device designated generally by the reference character 15, the same being adapted for use on any vehicle such as an automobile, a truck, a railroad car or the like, the frame of which is illustrated at 16.

In the accompanying drawings, the vehicle represented is an automobile, including a rear axle housing 17 containing a rotatable axle shaft 18. Needless to say, a pair of suspension devices are employed, one adjacent each end of the axle housing, but since the two devices are identical in construction, the description of one will suffice for both.

Each of the suspension devices 15 consists of a pair of opposed cylinder blocks 19 which are secured to the frame 16 forwardly and rearwardly of the axle housing 17, as will be clearly apparent. Each of the blocks 19 includes an oil cylinder 20 and a superposed air chamber 21 which communicates with the cylinder 20 through the medium of a connecting passage 22, and a reciprocable piston 23 is disposed in each of the cylinders, as is best shown in Figures 2 and 9.

The pistons 23 are rigidly mounted at the inner ends of the piston rods 24, the outer ends of which project from the cylinder 20 through suitable packing glands 25 and are provided with forked extremities whereby each rod may be pivotally connected to one of a pair of radius links 26, as indicated at 27.

Each of the links 26 consists of a pair of longitudinally aligned sections 28 which are adjustably connected together by means of a sleeve coupling 29, matters being so arranged that by rotating these couplings, the overall length of the links may be increased or decreased as desired.

Figure 4:
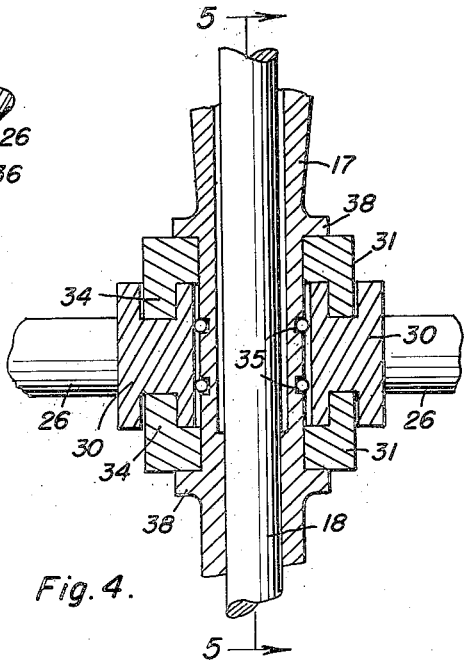
Figure 4 is a cross sectional view, taken substantially in the plane of the line 4—4 in Figure 3.
Figure 5:
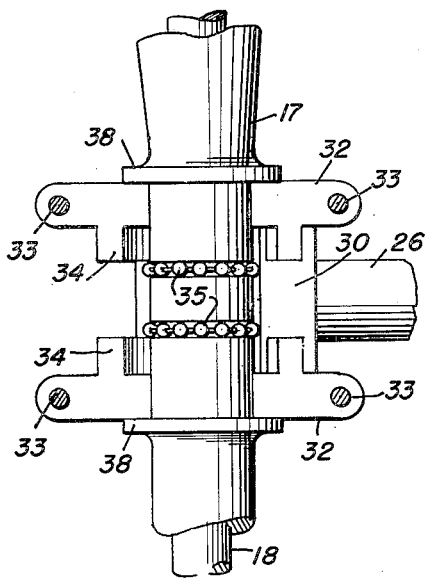
Figure 5 is a cross sectional view, taken substantially in the plane of the line 5—5 in Figure 4.

The links 26 are normally disposed in a substantially V-shaped formation, and the convergent ends of the links are provided with arcuate guides 30, which are of a substantially H-shaped cross sectional configuration, as is best shown in Figures 4 and 5.

Figure 6:
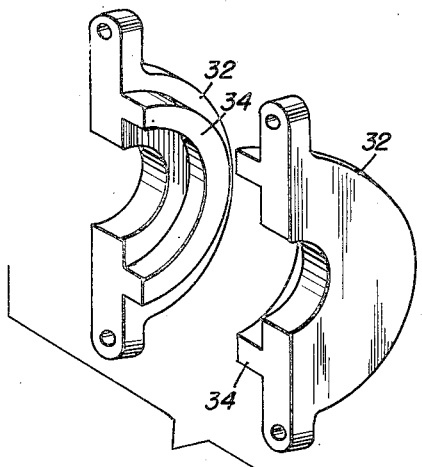
Figure 6 is a perspective view showing a pair of collar and flange sections used in the invention.

A pair of spaced collars 31 are mounted on the axle housing 17, each of these collars consisting of a pair of half sections 32 which are rigidly connected together as at 33. The configuration of the collar sections is best shown in Figure 6, and it will be noted that each collar, that is to say, each pair of half sections, is formed with an annular flange 34, these flanges slidably engaging the grooves in the H-shaped guides 30, as will be clearly apparent. Furthermore, two or more rows of anti-friction bearings 35 are provided between the axle housing 17 and the guides 30, the bearings 35 being retained in a suitable manner in suitable grooves with which the housing 17 is formed.

It will be observed that by virtue of this arrangement, the links 26 are movable in the direction of the arrows 36 with respect to the housing 17, and it will be also noted that the end faces 37 of the guides 30 will act as effective stops for preventing excessive movement of the links 26, when said faces are disposed in an abutting relation.

If desired, the axle housing 17 may be formed with a pair of annular shoulders or flanges 38 for retaining the members 31 in position, although the provision of the shoulders 38 should not be necessary, since the half sections 32 of the shoulders 38 are rigidly clamped together and to the axle housing, by means of the elements 33.

Referring now to the aforementioned cylinder blocks 19, it will be noted that the cylinders 20 of these blocks are provided with suitable filler plugs 39, while the chambers 21 are similarly provided with the plugs 40.

By removing the plugs 39, the cylinders 20 may be filled with oil, and similarly, by removing the plugs 40, the chambers 21 may be filled with compressed air. When these filling operations have been completed, the plugs 39, 40 may be replaced, so that the oil and compressed air are "sealed" in their respective chambers (20, 21), thereby rendering the device in readiness for use.

When the invention is placed in use, a road shock imparted to the wheel 41 (mounted on the axle 18) will cause the wheel and the associated axle to move upwardly, thereby urging the piston rods 24 in relatively opposite direction into the cylinders 20, as will be clearly understood. This movement will be accompanied by a corresponding movement of the pistons 23 in the direction of the arrows 42, and the movement of the pistons will, in turn, transmit pressure through the medium of the oil in the cylinders 20 to the compressed air in the chambers 21. The "cushioning" effect derived from the use of the invention will thus be clearly apparent.

The wheel 41 will be urged to its normal position by the pressure resulting from the additional compression of the air in the chamber 21, which pressure will urge the piston rods 24 outwardly. If desired, suitable bumper blocks 43, of rubber, or the like, may be secured to the frame 16, so as to prevent excessive movement of the axle housing 17 in the upward direction.

Referring now to the structure illustrated in the accompanying Figures 11 and 12, the same illustrate the manner in which the radius links 26, equipped with the guides 30, may be connected directly to an axle 43, in which instance this axle is not equipped with a housing corresponding to the aforementioned housing 18.

Under such circumstances, the axle may be formed with a pair of spaced, annular shoulders 44 and the sections 32 of the afore-mentioned collars 31 may be applied directly to the axle, so that they rotate in unison, therewith. The guides 30 are, in turn, slidably disposed between the flanges 34 of the collars 31, as will be clearly apparent.

Suitable anti-friction bearings 45 may, of course, be interposed between the guides 30 and the axle 43, the bearings 45 being retained in any suitable manner in suitable grooves with which the axle shaft is formed.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a device of the character described, the combination of a non-rotatable axle housing having a cylindrical outer surface provided with a plurality of spaced annular grooves, a pair of collar-like members secured to said housing at the opposite sides of said grooves, inturned opposing flanges provided on said members, a pair of arcuate guides disposed in coplanar relation between the members and provided with arcuate grooves to slidably receive said flanges, outstretched suspension rods provided on said guides, said guides having concave inner surfaces concentric with and spaced from the outer surface of said housing, and sets of rotatable anti-friction elements provided in said grooves and engaging the concave surfaces of said guides.

ALBERT LLOYD BATIK.

REFERENCES CITED

The following references are of record in the file of this patent:

UNITED STATES PATENTS

| Number | Name | Date |
|---|---|---|
| 378,534 | Williams | Feb. 28, 1888 |
| 872,605 | Boehringer | Dec. 3, 1907 |
| 1,449,703 | Sprague | Mar. 27, 1923 |
| 1,540,674 | Ashton | June 2, 1925 |
| 1,620,070 | Buckler | Mar. 8, 1927 |
| 2,028,991 | Pernice | Jan. 28, 1936 |
| 2,040,465 | Chilton | May 12, 1936 |

FOREIGN PATENTS

| Number | Country | Date |
|---|---|---|
| 275,367 | Germany | June 16, 1914 |